(12) United States Patent
Haeberle et al.

(10) Patent No.: US 9,926,711 B2
(45) Date of Patent: Mar. 27, 2018

(54) G-HOOK FOR MUTUAL RELEASABLE CONNECTION OF TWO PROP PORTIONS OF A VARIABLE LENGTH CONSTRUCTION PROP

(71) Applicant: PERI GmbH, Weissenhorn (DE)

(72) Inventors: Wilfried Haeberle, Langenau (DE); Rudolf Specht, Neu-Ulm (DE)

(73) Assignee: PERI GMBH, Weissenhorn (DE)

( * ) Notice: Subject to any disclaimer, the term of this patent is extended or adjusted under 35 U.S.C. 154(b) by 358 days.

(21) Appl. No.: 14/309,091

(22) Filed: Jun. 19, 2014

(65) Prior Publication Data

US 2014/0308064 A1    Oct. 16, 2014

Related U.S. Application Data

(63) Continuation of application No. PCT/EP2012/074387, filed on Dec. 4, 2012.

(30) Foreign Application Priority Data

Dec. 22, 2011    (DE) .................. 10 2011 122 065

(51) Int. Cl.
*E04G 25/06* (2006.01)
*F16B 7/10* (2006.01)
*F16B 17/00* (2006.01)
*F16B 21/14* (2006.01)

(52) U.S. Cl.
CPC ........... *E04G 25/06* (2013.01); *E04G 25/063* (2013.01); *E04G 25/066* (2013.01); *F16B 7/105* (2013.01); *F16B 17/006* (2013.01); *F16B 2021/14* (2013.01); *Y10T 403/32475* (2015.01)

(58) Field of Classification Search
CPC ....... E04G 25/00; E04G 25/06; E04G 25/061; E04G 25/063; E04G 25/066; E04G 11/38; E04G 11/48; Y10T 403/7086; Y10T 403/32501
See application file for complete search history.

(56) References Cited

U.S. PATENT DOCUMENTS 4,026,079 A    5/1977  Morris
4,752,057 A *  6/1988  Hagemes ................ E04G 25/00
                                                        248/354.3
5,160,109 A * 11/1992  de Leeuw ............. E04G 11/483
                                                        248/354.4

(Continued)

FOREIGN PATENT DOCUMENTS

CN    2706579 Y    6/2005
CN    201412067 Y  2/2010

(Continued)

*Primary Examiner* — Joshua T Kennedy
(74) *Attorney, Agent, or Firm* — Hackler Daghighian Martino & Novak (57) ABSTRACT

A G-hook for the mutual releasable connection of two prop portions of a telescopic construction prop has a pin and a hoop. The pin and the hoop are different, separate parts which are rotationally rigidly connected to one another, meaning the pin cannot rotate relative to the hoop because they are rigidly fixed to one another. The pin has a force introduction portion with a surface which is curved regionally and a force removal portion which is diametrically opposite the force introduction portion and whose surface is formed substantially planar.

25 Claims, 6 Drawing Sheets

(56) References Cited

U.S. PATENT DOCUMENTS

| | | | | |
|---|---|---|---|---|
| 5,326,065 A | * | 7/1994 | Jackson | E04G 5/02 248/351 |
| 7,744,054 B2 | * | 6/2010 | Xammar Bove | E04G 25/06 248/351 |
| 2007/0264076 A1 | * | 11/2007 | McCracken | E04G 25/061 403/315 |
| 2012/0042495 A1 | * | 2/2012 | Bacon | E04G 25/06 29/428 |

FOREIGN PATENT DOCUMENTS

| | | | | |
|---|---|---|---|---|
| DE | 7004565.7 | | 2/1970 | |
| DE | 3739754 A1 | * | 6/1989 | ............ E04G 11/48 |
| DE | 102009054628 A1 | | 6/2011 | |
| EP | 0 457 377 A1 | | 11/1991 | |
| EP | 0457377 A1 | * | 11/1991 | ........... E04G 11/483 |
| EP | 1837458 A2 | | 9/2007 | |
| EP | 1975341 A1 | * | 10/2008 | ............ E04G 25/06 |
| EP | 2 513 391 B1 | | 7/2011 | |
| FR | 2 898 923 A1 | | 9/2007 | |
| GB | 746083 | | 3/1956 | |
| GB | 1148656 | | 4/1969 | |
| GB | 2271802 A | * | 4/1994 | ........... E04G 11/483 |

\* cited by examiner

G-HOOK FOR MUTUAL RELEASABLE CONNECTION OF TWO PROP PORTIONS OF A VARIABLE LENGTH CONSTRUCTION PROP

CROSS-REFERENCE TO RELATED APPLICATIONS

This continuation application claims priority to PCT/EP2012/074387 filed on Dec. 4, 2012 which has published as WO 2013/092204 A1, which also claimed priority to the German application number 10 2011 112 065.1 filed on Dec. 22, 2011, the contents of which are fully incorporated herein with these references.

DESCRIPTION

Field of the Invention

The present invention relates in general to variable length, telescopic props such as are used, for example, in the construction industry as supports or bracing of concrete formwork elements. The present invention in particular relates to a G-hook for the mutual releasable connection of two prop portions of such a telescopic construction prop. The invention furthermore relates to a telescopic construction prop whose prop portions can be releasably connected to one another with the aid of G-hook in accordance with the invention.

Background of the Invention

Telescopic props such as are used in the field of construction as supports or bracing of concrete formwork elements as a rule have an outer tube and an inner tube telescopically displaceable therein. A so-called G-hook with a circular cross-section which extends through through-hole openings formed in the two tubes and aligned with one another usually serves for the mutual releasable connection of the two tubes. The shape of the G-hook is in this respect usually selected so that the G-hook can be fastened captively, i.e. non-losably, at a telescopic prop, which takes place via a hoop of the G-hook which engages around the prop. Such G-hooks are in this respect usually formed as a one-piece or one-part component from round steel by shaping thereof. Since up to 4 ton of load or even more has to be taken up per prop, the force transfer region between the two tubes and in particular the G-hook has to be dimensioned very carefully since the total load is transferred from the inner tube to the outer tube of the prop via it.

In this dimensioning, the bearing stresses along the through-hole openings of the two tubes frequently represent a decisive dimensioning criterion, which has the result that the diameter of the G-hook as a rule has to be given a larger dimension than would be necessary for the transverse force load bearing capacity. Since moreover the G-hook is subjected to bending strain due to a not insubstantial play between the inner tube and the outer tube, the dimensioning of the G-hook for bending strain can furthermore also become decisive, which in turn has the result that the diameter of the G-hook is selected larger, to achieve a section modulus which is as large as possible, than would be necessary for the transverse force removal. The G-hook also usually has the same cross-section over its total length even though this large cross-section is only necessary in the region of the outer tube diameter.

Since the G-hooks of conventional telescopic props are thus as a rule overdimensioned with respect to their transverse force load bearing capability, whereby unnecessary weight and unnecessary costs are generated, it is the underlying object of the invention to provide at least one implementation with which unnecessary weight and the associated costs are reduced.

In accordance with a first aspect of the present invention, a G-hook for the mutual releasable connection of two prop portions of a telescopic construction prop is provided to satisfy this object whereby the G-hook has the features of the first independent claim. The present invention fulfills these needs and provides other related advantages.

SUMMARY OF THE INVENTION

The G-hook in accordance with the invention includes a pin which serves for the mutual connection of the two prop portions as well as a hoop via which the pin can be captively secured to the prop. Provision is now made in accordance with the invention that the pin and the hoop are two different parts which are first present as different or separate components which are only joined together as part of the manufacture of the G-hook to form an assembled component, namely the G-hook in accordance with the invention. The pin and the hoop are in particular rotationally rigidly connected to one another during the manufacture of the G-hook, which can preferably take place via a press-fit connection, a form-fitted connection, a weld connection and/or a brazed connection. Use of the term "rotationally rigidly" means that it is torsionally stiff where one part cannot rotate relative to the other part. In other words this means that the pin and the hoop cannot rotate against each other and are fixed in position relative to one another.

Since the pin and the hoop are thus initially present as separate parts, it is possible to dimension only the pin very specifically with respect to the decisive dimensioning criteria. Provision is accordingly made in accordance with the invention that the pin has a force introduction portion having a surface which is curved at least regionally and has a force removal portion which is diametrically opposed to the force introduction portion and whose surface has no curvature or at least a curvature which is smaller than the curvature of the curved surface of the force introduction portion.

It is possible due to the rotationally rigid connection between the hoop and the pin of the G-hook in accordance with the invention to design the hoop as an open hook without impairing the security against losing which is effected by the hoop. The pin can thus namely not be pivoted relative to the hoop due to the rotationally rigid connection between the pin and the hoop after the pin has been pulled out of the through-hole openings of a construction prop. The spacing between the free end of the pin and the free end of the hoop is thus also maintained in this unlatched state of the G-hook and is dimensioned such that the G-hook cannot be removed from the respective prop at which it is secured.

Where it is here stated that the force introduction portion has a surface which is curved at least regionally, a substantially planar force introduction portion is also to be understood by this which is only rounded or chamfered in the transition regions toward the longitudinal sides of the pin. A square-section steel can thus, for example, also be used as pin for the G-hook in accordance with the invention which is only rounded along its edges to prevent unwanted stress peaks in the region of the adjacent components, in particular of the hole faces of the prop tubes. It can thus be ensured by the force introduction portion curved at least regionally that forces to be transferred via the pin are distributed over a large surface, whereby the bearing stresses can be kept small in the desired manner in the region of the through-hole openings of the inner tube of a telescopic construction prop.

The formation of the force removal portion as a planar or only slightly curved surface in contrast in particular proves advantageous when the forces to be transferred via the pin should not be introduced directly, but rather indirectly via a sunk nut into a prop portion, such as will be explained in even more detail below. Since this sunk nut likewise has a planar end surface on which the force transfer portion of the pin lies, not only a reduction of the stresses between the pin and the sunk nut is achieved by the planar or only slightly curved surface of the force removal portion. It is rather the case that it is also ensured by the planar or at least only slightly curved surface of the force removal portion that the pin cannot rotate, which could otherwise result in an unwanted manner in a bending thereof about its "weak" axis. In other words, a security against rotation or a self-centration is created by the substantially planar design of the force removal portion by which it can be ensured that the pin is always loaded in the desired direction.

The manufacture of the G-hook in accordance with the invention from two different, separate parts—pin and hoop—in particular thus proves to be advantageous in that the pin can be dimensioned and manufactured very specifically as a special section with respect to the decisive dimensioning criteria such as bending load capability and/or transverse force bearing capability as well as bearing stresses, whereas the hoop can be manufactured from a simple standard section as a lighter component, whereby ultimately not only weight, but also in particular costs can be saved. The manufacture of the G-hook in accordance with the invention from two different, separate parts, however also proves advantageous in that the pin and the hoop can be produced from different materials, in particular steels of different qualities, thanks to the multipart construction. The pin can thus, for example, be manufactured from a steel of the quality S355, whereas a steel of lower quality can be used for the hoop, whereby costs can again be saved.

In accordance with the invention, a two-part G-hook is thus provided for the first time whose individual parts—pin and hoop—are rotationally rigidly connected to one another, whereby due to the fact that only the pin which is responsible for the force removal between the prop portions of a telescopic construction prop can be designed as a solid special section, for example as a forged part, rolled section or cast part, of a steel, e.g. of the quality S355, whereas a simpler less expensive standard section can be used for the hoop which only serves as a security against loss, whereby the total weight of the G-hook and the manufacturing costs can be kept low in the previously explained manner. The hoop of the G-hook in accordance with the invention furthermore has a smaller cross-sectional surface in comparison with conventional G-hooks, which has the result that the hoop can be cold-formed, whereas the hoops of conventional G-hooks has to be hot-formed as a rule due to their larger cross-sectional surface. The manufacturing costs can thus be further reduced due to the cold forming.

In accordance with a further aspect of the present invention, the object underlying it is also satisfied by a telescopic construction prop with an outer tube and an inner tube displaceable therein, wherein a G-hook in accordance with the invention is used for the mutual releasable connection of the two tubes which extends through through-hole openings formed in the two tubes and aligned with one another.

Advantageous embodiments of the invention will now be looked at in the following discussion. Also, advantageous embodiments can furthermore result from the dependent claims, from the description of the figures and from the drawings.

The features explained in the following with respect to the G-hook in accordance with the invention as well as to the construction prop in accordance with the invention also apply in a corresponding manner to the respective subject manner not explicitly referenced. For example, the features explained with respect to the pin in accordance with the invention can be transferred in a corresponding manner to the telescopic construction prop or its G-hook.

Provision is thus made in accordance with an embodiment that the pin has a freely projecting first end and a fixed second end which is disposed opposite the first end and in the region of which it is connected to the hoop such that the end surface of the pin is exposed as a blow surface at its second end. In this respect, the force introduction portion and the force removal portion of the pin can in particular be connected to one another via a transition portion from which the hoop preferably projects at right angles and extends subsequently thereto in the direction of its free first end at least regionally in parallel to the pin. Unlike conventional G-hooks in which the pin merges into the hoop in one piece, the pin of the G-hook in accordance with the invention therefore has a defined end face at its second end via which the pin can be driven into the through-hole openings of a construction prop, for example using a hammer, in that blows are exerted by the hammer onto the end face of the pin in question.

To be able to mutually connect the pin and the hoop of the G-hook in accordance with the invention with simple means, provision is made in accordance with a further embodiment that an opening in which a second end of the hoop is secured is formed in the transition portion in the region of the second end of the pin. Provision is preferably made in this respect that the opening and the second hoop end are formed with a complementary contour to one another such that the second hoop end is secured in the opening in form-fitted and rotationally fixed manner. It is sufficient in this case to secure the second hoop end, for example, to a weld point at the pin so that the second hoop end cannot be pulled out of the opening formed in the transition portion of the pin. It would likewise be possible to widen the second hoop end slightly after it has been introduced into the opening in the transition portion of the pin in order thus additionally to generate a friction-locking connection between the second hoop end and the pin. It is then secured by a widening of the second hoop end outside the opening of the transition portion, in addition to the generated friction locking, that the second hoop end cannot be removed from this opening.

Provision is made in accordance with a further embodiment that the pin has a substantially U-shaped, C-shaped, double T-section shaped, O-shaped, tubular or oval cross-sectional configuration. In the case of a U-shaped cross-section, the free ends of the "U" together form the force removal portion and consequently the arc of the "U" forms the force introduction portion of the pin. If, in contrast, the pin has a substantially double T-section shaped cross-section, the force introduction portion is formed by one of the flanges of the double T with a surface curved at least regionally, whereas the force removal portion is formed by the other less-curved flange, or non-curved flange, of the double T. In the case of a C-shaped pin cross-section, the force introduction portion and the force removal portion are formed by mutually diametrically opposed curvature portions of the "C", but with one of these curvature portions being able to be flattened as a force removal portion.

To provide an introduction aid for the G-hook into the through-hole openings of the respective prop into which the G-hook is to be inserted, provision is made in accordance with a further embodiment that the pin tapers like a wedge in the direction of its freely projecting first end at least regionally.

Provision is preferably made in this respect that the pin which is wedge-shaped per se has two plateau regions which are spaced apart from one another in the longitudinal direction of the pin and in the region of which the pin does not taper. In this embodiment, the pin is formed, starting from its freely projecting end viewed in the longitudinal direction, by a widening first wedge portion, by a first plateau region adjoining it, by a widening second wedge shape adjoining it and by a second plateau region adjoining it, with the second wedge portion preferably being separated from the first plateau region by a step. The two plateau regions are in this respect spaced apart from one another by a measure which approximately corresponds to the diameter of the inner tube of the respective construction prop so that the inner tube can stand with the hole faces of its through-hole openings on the two plateau regions in the equipping state. Since the plateau regions of the pin, unlike the wedge sections, have a defined spacing from the lower side of the pin, it is thus ensured, on the one hand, that the respective construction prop whose length is delimited when using a G-hook in accordance with the invention has a defined length which does not depend on how far the wedge-shaped pin was driven into the through-hole openings of the prop. On the other hand, it is ensured by the plateau regions that the pin which tapers in wedge shape per se cannot be shaken loose by dynamic forces which can act on the prop.

Furthermore, the wedge-shaped design of the pin in accordance with the invention proves advantageous in that a so-called fast lowering of the prop head can thereby be implemented to thus achieve a relief of the prop. If namely the pin is again partly driven out of the through-hole openings of the respective prop in the equipping state of said prop, this has the result that the inner tube is lowered in accordance with the tapering of the pin, whereby the pin is relieved and can subsequently be dismantled more easily.

Since there is theoretically the possibility during the equipping process to drive the pin so far into the through-hole openings of a prop that the inner tube does not stand on the two plateau regions in the desired manner, but rather only on the widening second wedge portion, provision is made in accordance with a further embodiment that the second wedge section is separated from the first plateau region by a step. This step in this respect serves so-to-say as an abutment which comes into contact with the inner wall of the inner tube of the prop, whereby it is prevented that the pin is driven so far into the through-hole openings that the inner tube only stands on the widening second wedge section.

As can be seen from the above statements, it is the underlying recognition of the present invention that conventional G-hooks as a rule are overdimensioned regionally so that it is proposed in accordance with the invention to produce the G-hook from two separate parts—pin and hoop—whereby it is made possible to form only the pin very directly as a special section in order thus to achieve the required section moduli or to be able to observe the permitted bearing stresses. So that, however, the permitted bearing stresses can actually be observed, provision is furthermore made in accordance with the invention that the through-hole openings of the inner tube have a contour complementary to the envelope of the pin at least along the hole face region via which the force transfer takes place from the inner tube to the force introduction portion, with the through-hole openings of the inner tube having different height dimensions in the case of a pin tapering in the manner of a wedge. If therefore the pin has a C-shaped cross-sectional geometry, for example, provision is made that the through-hole openings of the inner tube have, analog to the envelopes of the C section of the pin, an oval design so that the forces from the inner tube can be transferred distributed over as large an area as possible via the hole face of the respective through-hole opening on the pin.

In order in this manner to be able to lead off loads introduced with the pin in the desired manner via the pin into the outer tube of a telescopic construction prop, the load removal to the outer tube takes place via the already previously mentioned sunk nut which is movable in the longitudinal direction of the prop via an external thread formed at the outer tube in the region of two mutually aligned through-hole openings of the outer tube which are formed as two slits extending in the longitudinal direction of the prop. The sunk nut in this respect has a planar end face on which the force removal portion of the pin of the G-hook stands over an area so that, in the case that the pin should be inclined for tilting about its longitudinal axis, a restoring force is generated which moves the pin back into its orientation for its intended purpose in which its force removal portion lies over its full area on the planar end face of the sunk nut. In this manner, not only a security against rotation is achieved, but additionally also a reduction of the stresses acting on the sunk nut, whereby a hardening of the surface of the sunk nut can be dispensed with. It can thus be prevented that the bolt of the G-hook presses into the planar end face of the sunk nut, which could otherwise result in an unwanted manner in the sunk nut no longer being able to be released, or only being able to be released with difficulty, under load or no longer being able to be rotated in the desired manner for purposes of the fine longitudinal adjustment of the prop.

Other features and advantages of the present invention will become apparent from the following more detailed description, when taken in conjunction with the accompanying drawings, which illustrate, by way of example, the principles of the invention.

BRIEF DESCRIPTION OF THE DRAWINGS

The accompanying drawings illustrate the invention. In such drawings.

DETAILED DESCRIPTION OF THE PREFERRED EMBODIMENTS

Figure 1:
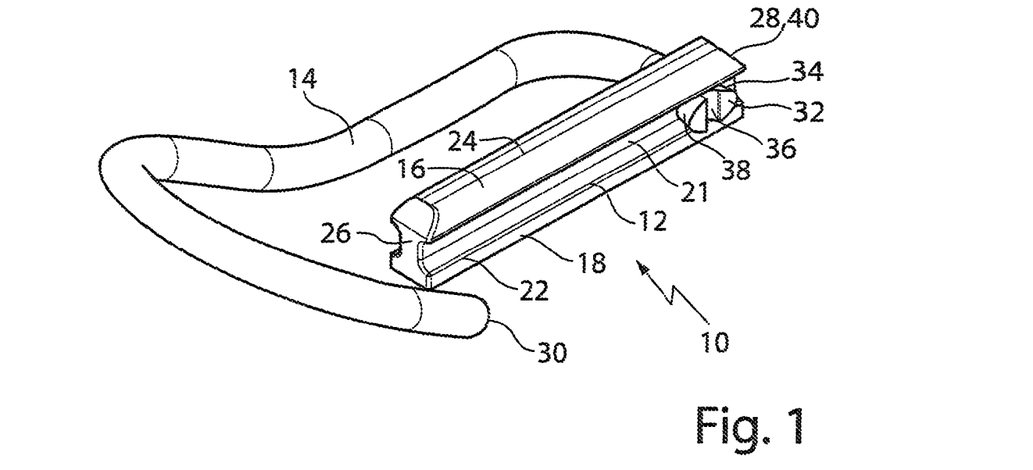
FIG. 1 shows a perspective representation of a G-hook in accordance with the invention in accordance with a first embodiment.
Figure 2:
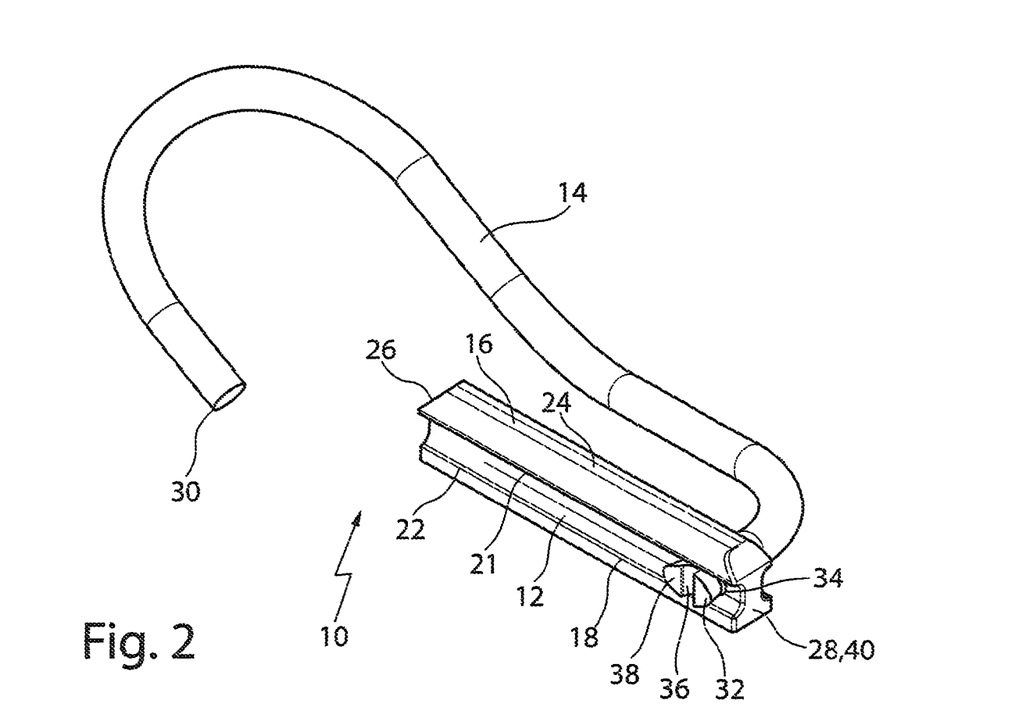
FIG. 2 shows another perspective representation of the G-hook of FIG. 1.
Figure 8:
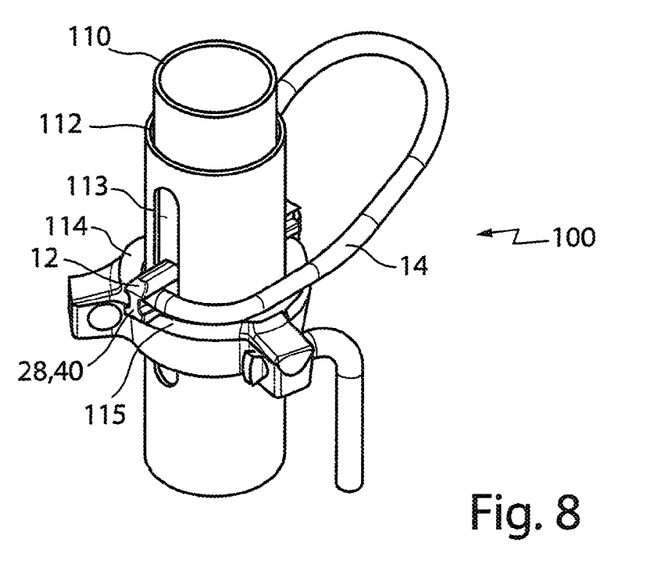
FIG. 8 shows a perspective representation of a portion of a construction prop in accordance with the invention.

A first embodiment of a G-hook 10 in accordance with the invention will now first be described in the following with reference to FIGS. 1 to 3, said G-hook serving for the mutual releasable connection of two prop portions 110, 112 of a telescopic construction prop 100 such as will be described in more detail in the following by way of example with reference to FIG. 8. The G-hook 10 in accordance with the invention is substantially composed of two different, separate parts, namely a pin 12 which serves for the mutual connection of the two prop portions and a hoop 14 via which the pin 12 can be captively secured to the construction prop 100 in that the hoop 14 engages around the construction prop 100. In accordance with the invention, the two parts—pin 12 and hoop 14—of which the G-hook 10 is composed are rotationally rigidly connected to one another, which can take place, for example, in that the hoop 14 is welded to the pin 12. In the embodiment shown, the pin 12 and the hoop 14 are, however, connected to one another with form fitting and friction locking, which will be looked at in more detail in the following.

Figure 3:
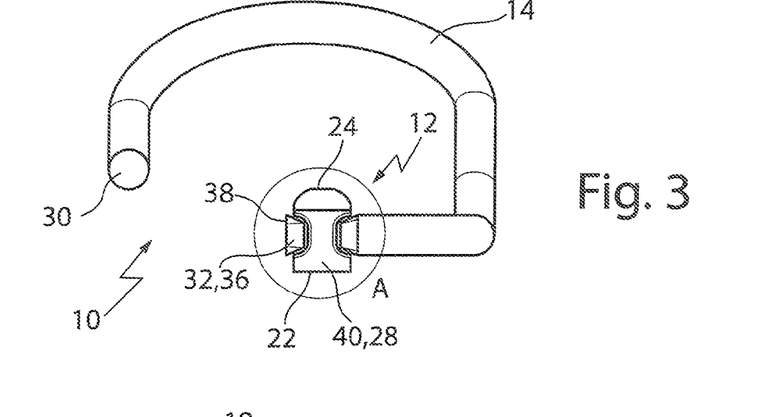
FIG. 3 shows a side view of the G-hook of FIGS. 1 and 2.
Figure 4:
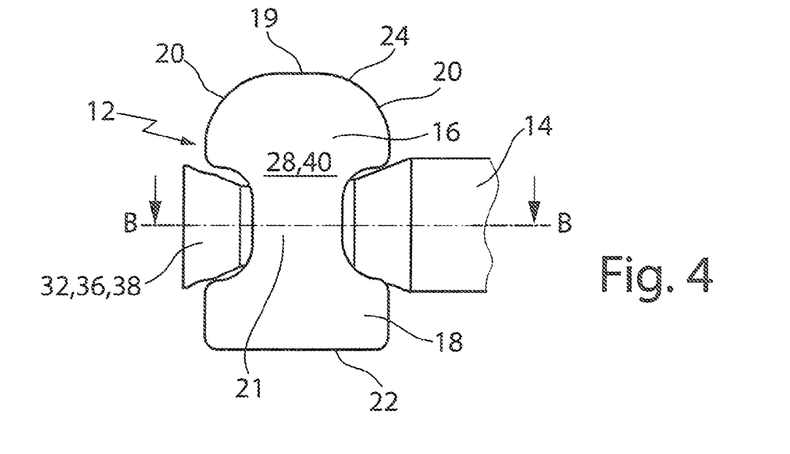
FIG. 4 shows an enlarged representation of the detail "A" of FIG. 3.
Figure 5:
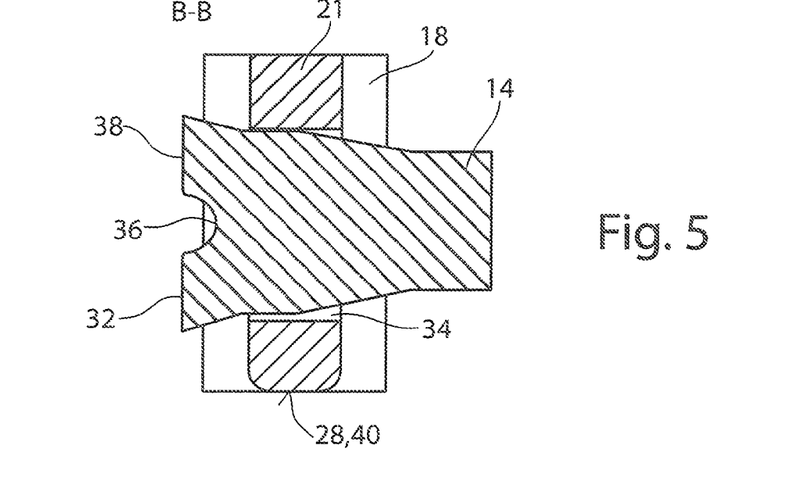
FIG. 5 shows a sectional representation along the lines B-B of FIG. 4.

As can in particular be seen from the detail "A" of FIG. 3 shown in FIG. 4, the pin 12 in the embodiment shown has a cross-section of substantially double T-section shape, with the upper flange 16 having a planar surface with an infinitely small curvature in its middle region 19, whereas the upper flange 16 is formed in each case with a curved surface in its side regions 20, with the curvature of said surface also being able to be much larger than in the embodiment shown in FIG. 4 so that the cross-section would be substantially symmetrical to the line B-B. The upper flange 16 is connected via a web 21 or via transition region 21 to the lower flange 18 of the double T-section shaped pin 12, with the lower surface of the lower flange 18 being made substantially planar and thus likewise having an infinitely small curvature.

The planar surface of the lower flange 18 forms a force removal portion 22 of the pin 12 since the forces introduced into the pin 12 can be led off evenly distributed via it. The at least regionally curved surface of the upper flange 16 in contrast forms a force introduction portion 24 of the pin via which the forces can be introduced from the prop into the pin 12, with a uniform bearing stress distribution being able to be achieved by the curved side regions 20.

Due to the design of the pin 12 with a substantially double T section shaped cross-section, it is possible in comparison with a conventional G-hook with a circular cross-section to achieve the same static cross-sectional values, or even improved static cross-sectional values, with a smaller material consumption, whereby ultimately the manufacturing costs can be lowered. The costs for the manufacture of the G-hook 10 in accordance with the invention can in particular be reduced in that the pin 12 and the hoop 14 are different parts so that, for example, the hoop 14 can be produced from a simple round steel of low quality, whereas the pin 12 can be produced as a special section of higher quality steel with, for example, a cross-section of double T-section shape, as is the case in the embodiment shown with reference to FIGS. 1 to 5. In other words, the costs for the G-hook 10 in accordance with the invention can be reduced due to the two-part form thereof in that, for example, the pin 12 is formed as a comparatively solid component with optimized static cross-sectional values, whereas a less solid standard section with smaller static cross-sectional values can be used for the hoop 14. Accordingly, the cost advantages of the present invention can also be achieved with an embodiment in which the pin 12 is formed as a simple square section with optionally slightly rounded edges in order thus, as in the embodiment explained with reference to FIGS. 1 to 5, to be able to achieve a bearing stress distribution which is as uniform as possible.

The manufacture of the G-hook 10 in accordance with the invention from two different, separate components 12, 14, however, proves advantageous not only because the pin 12 and the hoop 14 can have different cross-sections due to the two-part design. It is rather the case that due to the two-part design of the G-hook 10, the pin 12 and the hoop 14 can be produced from different materials, in particular steels of different quality, so that only the pin 12 has, for example, to be produced from a steel of the quantity S355, whereas a steel of lower quality can be used for the hoop 14, whereby the manufacturing costs can again be lowered. The hoop 14 of the G-hook 10 in accordance with the invention furthermore has a smaller cross-sectional surface in comparison with conventional G-hooks, which has the result that the hoop 14 can be cold-formed, whereas the hoops of conventional G-hooks have to be hot-formed as a rule due to their larger cross-sectional surface. The manufacturing costs can thus be further reduced due to the cold forming.

A further advantage of the G-hook 10 in accordance with the invention results in that, due to the attachment of the hoop 14 as a separate component to the pin 12, the second end 28 of the pin disposed opposite the front, freely projecting first end 26 or the end face 40 is outwardly exposed at the second end 28 of the pin 12 and can thus be used as a blow surface via which the pin 12 can be driven into the through-hole openings of a construction prop. The hoop 14 is thus namely laterally attached to the web 21 which connects the upper flange 16 serving as a force introduction portion 24 and the lower flange 18 serving as a force transfer portion 22 to one another. Due to the fact that the hoop 14 thus projects from the transition portion 21 substantially at right angles to extend from there in the direction of its free first end 30, the end face 40 at the second end 28 of the pin 12 is thus exposed so that the pin 12 can be driven into the through-hole openings of a prop via it with the aid of a hammer. Since the hoop 14 projects substantially at right angles from the transition portion 21, the hoop 14 only has to be bent by approximately 90° in order extend from there in the direction of its free first end 30. In comparison with conventional G-hooks, the bending radius can thus be increased so that even larger hoop cross-sections can be bent by cold shaping, whereby the manufacturing costs are kept low.

The hoop 14 could admittedly be welded to the web 21 laterally in the region of the second end 28 of the pin 12. Provision is, however, made in the embodiment shown that an opening 34 is formed in the web 21 in the region of the second end 28 of the pin 12 and receives the second end 32 of the hoop 14. As can best be seen from FIGS. 5 and 9, in this respect the opening 34 has an oval design through which the second end 32 of the hoop 14 previously shaped to form an oval cross-section is inserted so that a rotationally rigid connection is already present between the pin 12 and the hoop 14 due to the mutually complementary contours of the opening 34 and of the second end 32 of the hoop 14.

To prevent the hoop 14 from again being able to be pulled out of the opening 34, a notch 36, by which the second end 32 of the hoop 14 is widened so that the hoop 14 is captively connected to the hoop 12, is stamped into the end face of the hoop 14 at the second end 32 in the embodiment shown with reference to FIGS. 1 to 5. It is, however, likewise possible, instead of securing the hoop 14 in the opening 34 via the widened portion caused by means of the notch 36, to weld or braze the hoop 14 to the web 21 at points, whereby it can likewise be prevented that the hoop 14 can be removed from the opening 34.

Figure 6:
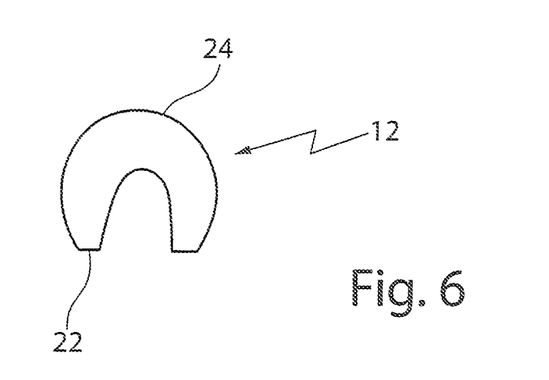
FIG. 6 shows another cross-sectional shape for the pin of a G-hook in accordance with the invention.

Although the G-hook 10 shown with reference to FIGS. 1 to 5 has a pin 12 with a cross-section substantially of double T-section shape, the pin 12 can, however, also have other cross-sectional shapes. The pin 12 can, for example, in the already previously explained manner have a square cross-section with slightly rounded or chamfered edges. In accordance with a further embodiment, provision is made that the pin 12 has a substantially U-shaped cross-section in accordance with FIG. 6, with the two free ends of the "U" each being flattened in order together to form a force removal section 22 via which the forces introduced into the pin 12 can be led off uniformly distributed. The surface portion of the pin 12 disposed opposite the two free ends of the "U", in contrast, forms a force introduction portion 24 with a curved surface, whereby a uniform bearing stress distribution can be achieved in the desired manner.

Figure 7:
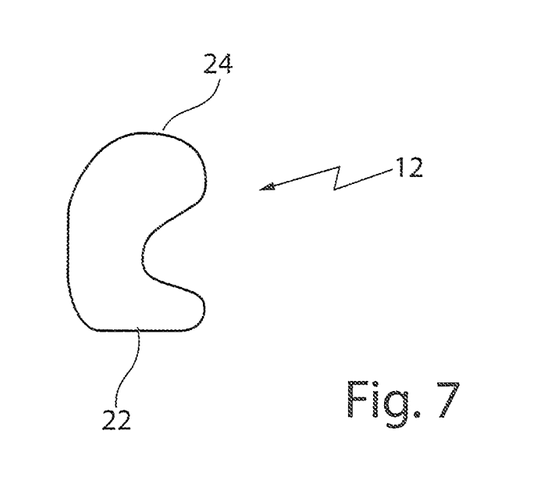
FIG. 7 shows yet another cross-sectional shape for the pin of a G-hook in accordance with the invention.

In accordance with a further embodiment, the G-hook 10 in accordance with the invention can have a pin 12 with a substantially C-shaped cross-sectional design as is shown in FIG. 7. Both a curved force introduction portion 24 and a flattened force removal 22 are again provided here which are here formed by the mutually diametrically opposed curvature portions of the "C".

Figure 9:
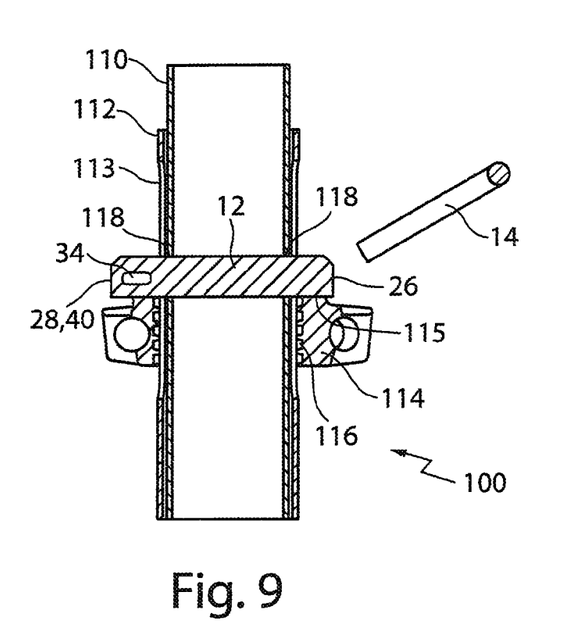
FIG. 9 shows a vertical section through the prop of FIG. 8.
Figure 10:
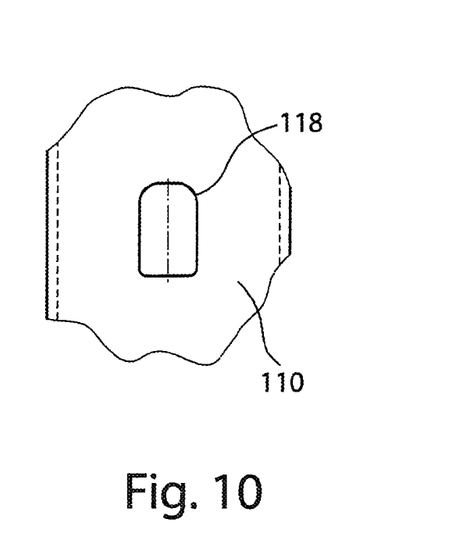
FIG. 10 shows a view of the inner tube of the prop of FIG. 8 in the region of a through-hole opening.

A telescopic construction 100 in accordance with the invention will now be described with reference to FIGS. 8 to 10 which has an outer tube 112 and an inner tube 110 telescopically displaceable therein. In accordance with FIG. 9, the outer tube 112 is provided at its free end with an external thread 116 (not shown in FIG. 8 for reasons of clarity) onto which a sunk nut 114 is screwed. Furthermore, the outer tube 112 has two mutually oppositely disposed through-hole openings 113 in the form of elongate slits, whereas the inner tube 110 has a plurality of through-hole openings 118 spaced apart from one another in the longitudinal direction of the prop which are aligned with the elongate through-hole openings 113 of the outer tube 112.

As can in particular be seen from FIG. 9, the pin 12 of the G-hook 10 extends through the through-hole openings 113, 118 formed in the two tubes 110, 112 and aligned with one another, with here the pin 12 of the G hook 10 having the cross-sectional configuration of double T-section shape in particular explained with reference to FIG. 4. The loads from the inner tube 110 are consequently transferred via the hole faces of the through-hole openings 118 into the pin 12 and from there via the sunk nut 114 to the outer tube 112 of the prop 100. To keep the bearing stresses along the hole faces of the through-hole openings 118 small in the desired manner, the through-hole openings 118 of the inner tube 110 have a contour complementary to the envelopes of the pin 12. The surface pressures between the sunk nut 114 and the flattened force removal portion 22 are likewise kept small, which is due to the fact that it stands over its full area on the planar end face 115 of the sunk nut 114.

Since the surface pressures between the sunk nut 114 and the force removal portion 22 are thus kept small, there is no risk that the pin 12 presses into the sunk nut 114, which would otherwise have the consequence that the sunk nut 114 cannot be turned or can only be turned with difficulty for the fine longitudinal adjustment of the telescopic construction prop 100 or cannot be released or can only be released with difficulty under load. The tendency of the G-hook 10 to rotate about the longitudinal axis of the pin 12 due to its G-shaped design is furthermore countered by the planar formation of the force removal section 22 of the pin 12 in that the transverse forces acting in the pin 12 in conjunction with the planar design of the force removal portion 22 act as a restoring force on the G-hook 10 which counters an unwanted rotation thereof.

In the case that no sunk nut 114 is provided for the fine longitudinal adjustment and consequently a plurality of through-hole openings 113 arranged mutually spaced apart are provided instead of the slit-like through-hole openings 113 in the outer tube 112 and in the inner tube 110, these through-hole openings 113 and/or also the through-hole openings 118 can have a complementary contour to the contour of the respective pin 12 in the inner tube 110. The contour of the respective through-hole openings 113, 118 in this respect does not have to exactly correspond to the contour of the pin 12 provided it prevents an unwanted pin rotation. A security against rotation can thus also be provided in this manner so that in this case a planar design of the force removal section 22 could at least be dispensed with in favor of the reduction of the bearing stresses when no sunk nut 114 is provided into which the pin 12 could press for the fine longitudinal adjustment.

Figure 11:
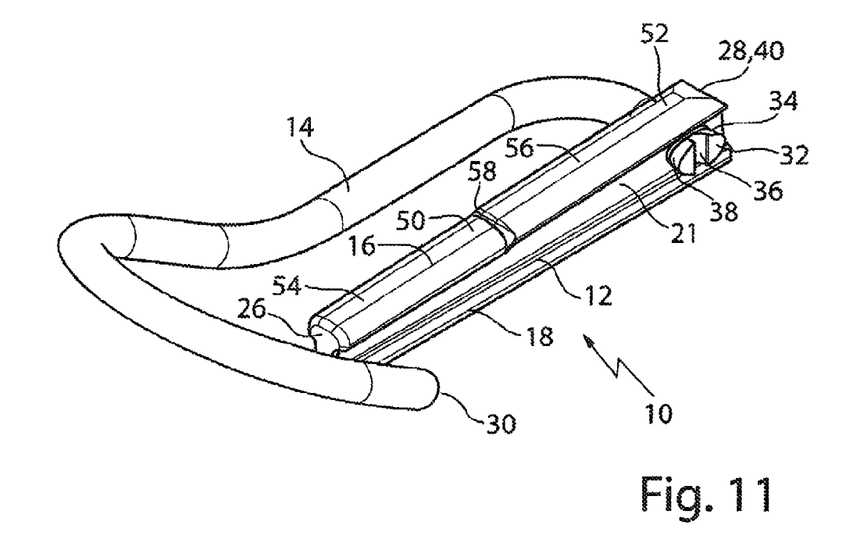
FIG. 11 shows a perspective representation of a G-hook in accordance with the invention in accordance with another embodiment.
Figure 12:
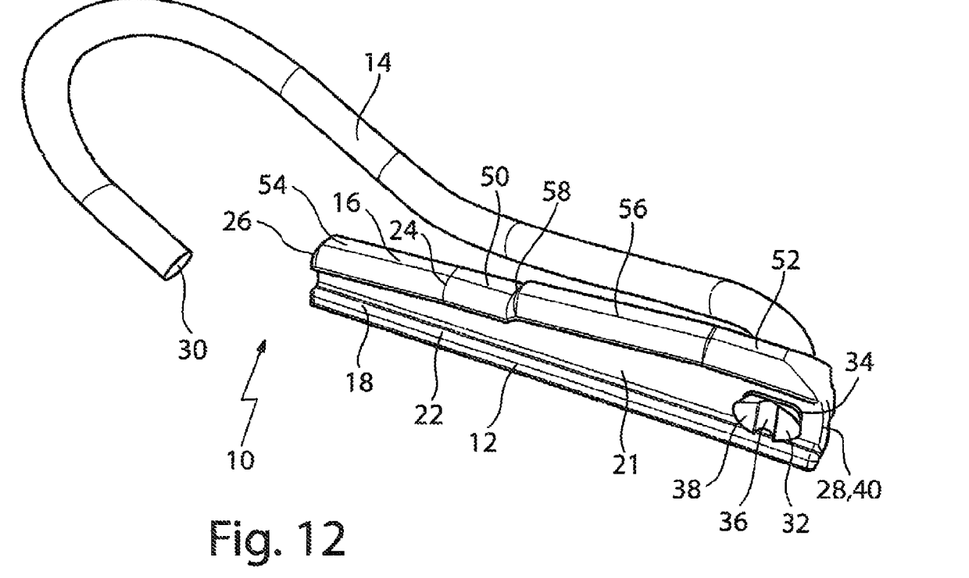
FIG. 12 shows another perspective representation of the G-hook of FIG. 11.

A further embodiment of a G-hook 10 in accordance with the invention will now be described with reference to FIGS. 11 and 12 which substantially only differs from the first embodiment shown with reference to FIGS. 1 to 5 in that the pin 12 tapers in a wedge-like manner at least regionally in the direction of its freely projecting first end 12. The pin 12 can admittedly taper continuously in a throughgoing manner from its second end 28 up to its first end 26. In accordance with the embodiment shown in FIGS. 11 and 12, however, provision is made that the substantially wedge-shaped pin 12 has two plateau regions 50, 52 in its force introduction portion 24 which are spaced apart from one another in the longitudinal pin direction and in the region of which the pin 12 does not taper. The pin 12 is thus formed, starting from its freely projecting first end 26 viewed in the longitudinal direction, by a widening first wedge portion 54, by a first plateau region 50 adjoining it, by a widening second wedge section 56 adjoining it and by a second plateau region 52 adjoining it, with the second wedge portion 56 being separated from the first plateau region 50 in the embodiment shown by a step 58 which is provided in the force introduction portion 24.

The wedge-shaped design of the pin 12 in this respect proves advantageous, on the one hand, in that an introduction aid is so-to-say thereby provided which facilitates the introduction of the pin 12 into the through-hole openings of two prop portions 110, 112. On the other hand, the wedge-shaped design of the pin 12 allows a fast lowering of a telescopic construction prop 100 whose prop portions 110, 112 are connected to one another with the aid of such a wedge-shaped pin (see FIG. 13) in that, for example, a force is applied to the end face at the first end 26 of the pin 12 with the aid of a hammer blow. As a consequence of the hammer blow, the pin 12 is partly driven out of the prop 100, which has the consequence that the inner tube 110 lowers in accordance with the tapering of the pin 12, whereby the prop 100 is relieved and can subsequently be more easily dismantled.

Figure 13:
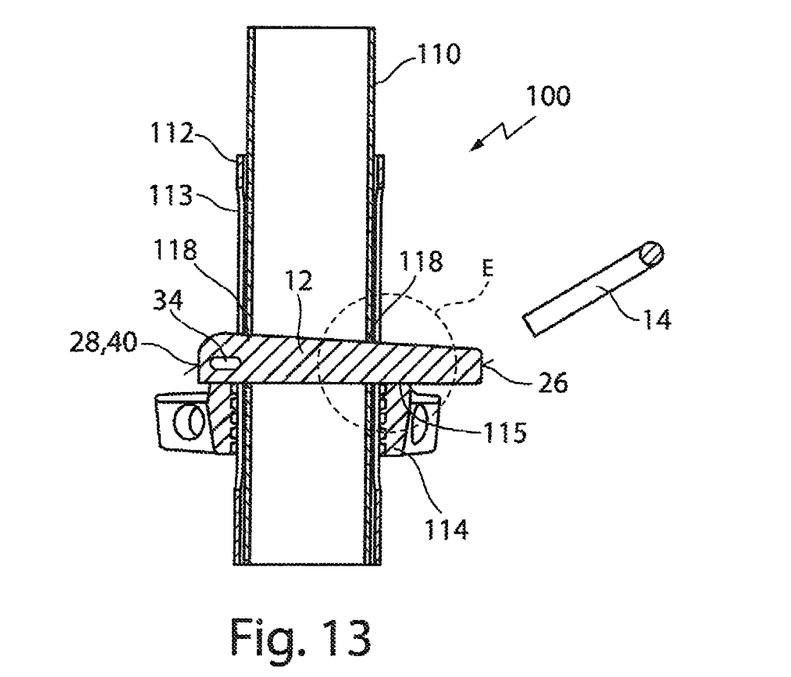
FIG. 13 shows a vertical section through a construction prop with the G-hook in accordance with FIGS. 11 and 12.
Figure 14:
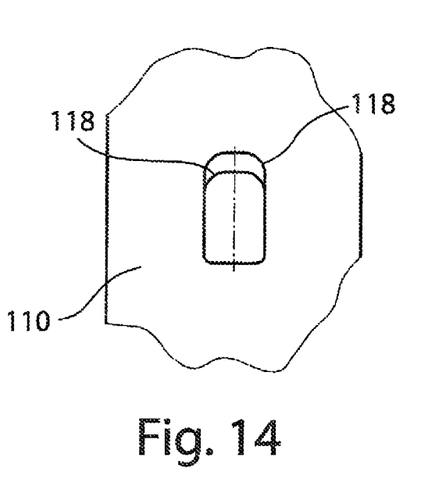
FIG. 14 shows a view of the inner tube of the prop of FIG. 13 in the region of the through-hole openings.

So that the loads from the inner tube 110 are not only transferred to the pin 12 via the hole face of one of the through-hole openings 118 in the case of a G-hook 10 with a wedge-shaped pin 12, provision is made in this embodiment that the through-hole openings 118 of the inner tube 110 are of different heights (see FIGS. 13 and 14). The heights of the two through-hole openings 118 are to be selected in this respect such that the inner tube 110 stands over its full area on the force introduction portion 24 of the wedge-shaped pin 12 along the upper hole face regions of its two through-hole openings 118.

To prevent shaking loose of the pin 12 tapering in wedge shape due to dynamic loads which can act on the prop 100, it proves advantageous to form the same in the already previously explained manner with the two plateau regions 50, 52 in the region of which the pin 12 does not taper. The plateau regions 50, 52 are in this respect spaced apart from one another by a measure which approximately corresponds to the tube diameter of the inner tube 110 so that it can stand on the two plateau regions 50, 52. The design of the pin 12 with the two plateau regions 50, 52 furthermore proves advantageous in that the length of the telescopic prop 100 does not depend on how far the wedge-shaped pin 12 is driven into the through-hole openings 118. It only has to be ensured that the wedge-shaped pin 12 is driven so far into the through-hole openings 118 that the inner tube 18 stands on the plateau regions 50, 52, whereby all similar props which are equipped with such a wedge-shaped pin 12 can be brought to the same extension length.

Figure 15:
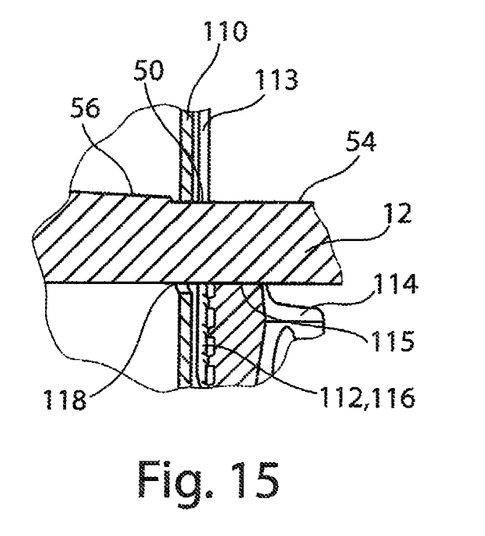
FIG. 15 shows the detail "E" of FIG. 13 in an enlarged representation.

In order not to have the risk during the driving of the wedge-shaped pin 12 into the through-hole opening 18 of the inner tube 110 that the pin 12 is driven so far into the prop 100 that the second wedge portion 56 moves into the region of the corresponding through-hole opening 118 in the inner tube 110, the already previously explained step 58 is formed between the second wedge portion 56 and the first plateau region 50 and in this case comes to lie at the inner wall of the inner tube 110 in accordance with FIG. 15 and thus prevents too far a driving of the pin 12 into the prop 100. Too far a driving of the pin 12 into the prop 100 of such a type is equally prevented by the hoop 14 since it preferably stands at right angles from the pin 12 in the previously explained manner. This has the result that the hoop 14 in accordance with FIG. 13 moves into contact with the outer tube 114, whereby too far a driving of the pin 12 into the prop 100 is prevented so that the forming of the step 58 between the second wedge portion 56 and the first plateau region 50 could be dispensed with.

Although several embodiments have been described in detail for purposes of illustration, various modifications may be made to each without departing from the scope and spirit of the invention. Accordingly, the invention is not to be limited, except as by the appended claims.

Reference Numeral List:
10 G-hook
12 pin
14 hoop
16 upper flange
18 lower flange
19 middle region of 16
20 side regions of 16
21 web or transition region between 16 and 18
22 force removal portion
24 force introduction portion
26 first or free end of 12
28 second end of 12
30 first or free end of 14
32 second end of 14
34 opening
36 notch
38 widened portion
40 end face
50 first plateau region
52 second plateau region
54 first wedge portion
56 second wedge portion
58 step
100 telescopic construction prop
110 inner tube
112 outer tube
113 longitudinal through-hole opening in 112
114 sunk nut
115 end face of 114
116 external thread at 112
118 through-hole opening in 110

What is claimed is:

1. A G-hook for the mutual releasable connection of two prop portions of a telescopic construction prop, the G-hook comprising:
    a pin configured for the mutual connection of the two prop portions; and
    a hoop configured for captively securing the pin to the telescoping construction prop;
    wherein the pin and the hoop are two different parts which are produced from different qualities of steel, wherein the pin is of a higher quality of steel in comparison to the hoop, the pin configured to be dimensioned and manufactured for increased bending load capability, transverse force bearing capability, and bearing stress in comparison to the hoop and wherein the pin and hoop are rotationally rigidly connected to one another;
    wherein the pin comprises a force introduction portion diametrically opposed to a force removal portion, where the force introduction portion comprises a first surface which is curved at least regionally, and where the force removal portion comprises a second surface that is substantially planar, or where the second surface has a curvature which is less curved than the curvature of the first surface.

2. The G-hook of claim 1, wherein the hoop is connected to the pin by a press fit connection, a form-fitted connection, a weld connection and/or a brazed connection.

3. The G-hook of claim 1, wherein the pin has a freely projecting first end disposed opposite a second end of the pin, and where the hoop has a free end disposed opposite a second end of the hoop, where in the region of the second end of the pin is connected to the second end of the hoop, and where an end face of the pin at the second end comprises a blow surface.

4. The G-hook of claim 3, wherein the blow surface is substantially perpendicular to a longitudinal length of the pin.

5. The G-hook of claim 3, wherein the force introduction portion and the force removal portion of the pin are mutually connected via a transition portion.

6. The G-hook of claim 5, wherein the hoop projects at a right angle at its second end at least regionally from the transition portion and then subsequently extends in a direction that is parallel to the freely projecting first end of the pin.

7. The G-hook of claim 6, including an opening formed in the region of the second end of the pin in its transition portion, where the second end of the hoop is secured in the opening in the second end of the pin.

8. The G-hook of claim 7, wherein the opening formed in the second end of the pin has mutually complementary contours in comparison to the second end of the hoop configured to secure the hoop to the pin in a form-fitted manner.

9. The G-hook of claim 1, wherein the pin comprises a cross-section of substantially double T-section shape having a first flange opposite a second flange, wherein the force introduction portion is formed by the first flange and wherein the force removal portion is formed by the second flange.

10. The G-hook of claim 1, wherein the pin comprises a substantially U-shaped cross-section, with the free ends of the "U" each forming the force removal portion.

11. The G-hook of claim 1, wherein the pin comprises a substantially C-shaped cross-section, with the force introduction portion and the force removal portion being formed by mutually diametrically opposed curvature portions of the "C".

12. The G-hook of claim 1, wherein the pin comprises a substantially tubular cross-section that comprises an O-shaped cross-section or an oval-shaped cross section.

13. The G-hook of claim 1, wherein the pin tapers at least regionally in the manner of a wedge in the direction of its freely projecting first end.

14. The G-hook of claim 13, wherein the pin comprises two plateau regions which are spaced apart from one another along the longitudinal direction of the pin and wherein the two plateau regions do not taper.

15. The G-hook of claim 1, wherein the pin comprises, starting from its freely projecting end viewed along the longitudinal direction, a widening first wedge portion transitioning to a first plateau region which transitions to a widening second wedge portion which transitions to a second plateau region, where a step is disposed between the first plateau region and the widening second wedge portion.

16. The G-hook of claim 1, including a telescopic construction prop having an outer tube and an inner tube displaceable therein, wherein the G-hook is configured for the mutual connection of the two tubes and extending through a through-hole opening formed in each of the two tubes when the through-hole openings are aligned with one another.

17. The G-hook of claim 16, wherein the through-hole openings of the inner tube have a complementary contour to an envelope of the pin at least along the force introduction portion.

18. The G-hook of claim 17, wherein the pin tapers at least regionally in the manner of a wedge in the direction of its freely projecting first end and wherein two mutually aligned through-hole openings of the inner tube are each being of different heights in the case of the pin tapering in the manner of the wedge.

19. The G-hook of claim 18, wherein the mutually aligned through-hole openings of the outer tube are formed as two slits which extend in a longitudinal direction of the prop and in the region of which a sunk nut is movable in the longitudinal direction of the prop via an external thread formed at an external surface of the outer tube, with the sunk nut having a planar end face on which the force removal portion of the pin of the G-hook abuts.

20. The G-hook of claim 1, wherein the pin is a forged part pin, a rolled section pin or a cast part pin, and wherein the hoop is a cold-formed hoop.

21. A G-hook for the mutual releasable connection of two prop portions of a telescopic construction prop, the G-hook comprising:
   a pin configured for the mutual connection of the two prop portions, the pin comprising a freely projecting first end disposed opposite a second end of the pin, where the second end of the pin comprises a blow surface that is substantially perpendicular to a longitudinal length of the pin; and
   a hoop comprising a curved free end opposite a second end, where the second end of the hoop is non-moveably connected to the second end of the pin, and wherein the curved free end of the hoop is configured for captively securing the pin to the telescoping construction prop;
   wherein the pin and the hoop are separately manufactured parts of two different qualities of steel, wherein the pin is of a higher quality of steel in comparison to the hoop, the pin configured to be dimensioned and manufactured for increased bending load capability, transverse force bearing capability, and bearing stress in comparison to the hoop.

22. The G-hook of claim 21, wherein the pin is a forged part pin, a rolled section pin or a cast part pin, and wherein the hoop is a cold-formed hoop.

23. A G-hook for the mutual releasable connection of two prop portions of a telescopic construction prop, the G-hook comprising:
   a pin portion connected to a hoop portion, where the pin portion is separately manufactured from the hoop portion but non-movably connected to one another;
   where the pin portion is configured for the mutual connection of the two prop portions, and where the pin portion comprises a freely projecting first end disposed opposite a second end along a longitudinal length, where the second end comprises a blow surface that is substantially perpendicular to the longitudinal length of the pin portion, and wherein the pin portion comprises a force introduction portion diametrically opposed to a force removal portion both disposed along its longitudinal length, where the force removal portion is substantially planar and the force introduction portion is substantially curved; and
   wherein the hoop portion comprises a curved free end opposite a second end, where the second end of the hoop portion is non-moveably connected to the second end of the pin portion, wherein the curved free end of the hoop portion is configured for captively securing the pin portion to the telescoping construction prop;
   wherein the pin portion and the hoop portion are produced from steels of different quality, wherein the pin portion is of a higher quality of steel in comparison to the hoop portion, the pin configured to be dimensioned and manufactured for increased bending load capability, transverse force bearing capability, and bearing stress in comparison to the hoop.

24. The G-hook of claim 23, wherein the pin portion is a forged part pin portion, a rolled section pin portion or a cast part pin portion, and wherein the hoop portion is a cold-formed hoop portion.

25. A G-hook for the mutual releasable connection of two prop portions of a telescopic construction prop, the G-hook comprising:

a pin configured for the mutual connection of the two prop portions; and
a hoop attached to the pin, the hoop configured for captively securing the pin to the telescoping construction prop;
wherein the pin comprises a force introduction portion diametrically opposed to a force removal portion;
wherein the force introduction portion comprises a first surface having a planar surface middle region disposed between two curved surface side regions; and
wherein the force removal portion comprises a second surface that is substantially planar, or wherein the second surface has a curvature which is less curved than the curvature of the first surface.

* * * * *